United States Patent [19]

Yamaguchi et al.

[11] Patent Number: 4,815,288
[45] Date of Patent: Mar. 28, 1989

[54] NON-STEP HYDRAULIC TRANSMISSION

[75] Inventors: Kouji Yamaguchi; Noboru Yamamoto, both of Saitama, Japan

[73] Assignee: Honda Giken Kogyo Kabushiki Kaisha, Tokyo, Japan

[21] Appl. No.: 670,670

[22] Filed: Nov. 13, 1984

Related U.S. Application Data

[63] Continuation of Ser. No. 314,551, Oct. 23, 1981, abandoned.

[30] Foreign Application Priority Data

Oct. 23, 1980 [JP] Japan .................... 55-148748

[51] Int. Cl.$^4$ .............................. F16D 31/02
[52] U.S. Cl. .......................... 60/443; 60/487
[58] Field of Search .................... 60/443, 487, 489

[56] References Cited

U.S. PATENT DOCUMENTS 3,756,672  9/1973  Hibner et al. ............. 60/39.161

FOREIGN PATENT DOCUMENTS

| | | | |
|---|---|---|---|
| 53-88460 | 3/1978 | Japan | 60/443 |
| 55-2884 | 1/1980 | Japan | 60/443 |
| 55-2881 | 1/1980 | Japan | 60/443 |
| 55-1292 | 1/1980 | Japan | 60/443 |
| 55-33912 | 3/1980 | Japan | 60/443 |
| 775494 | 5/1957 | United Kingdom | 60/487 |

Primary Examiner—Ira S. Lazarus
Attorney, Agent, or Firm—Armstrong, Nikaido, Marmelstein & Kubovcik

[57] ABSTRACT

A non-step hydraulic transmission is provided which includes a hydraulic pump having a pump cylinder and a plurality of pump plungers slidably fitted into the pump cylinder. The pump plungers are arranged in a circular pattern around the axis of the pump cylinder. A hydraulic motor having a motor cylinder concentrically surrounds the pump cylinder and a plurality of motor plungers are slidably fitted into the motor cylinder. The motor plungers are arranged in a circular pattern around the axis of the motor cylinder. A hydraulic circuit hydraulically couples the pump and the motor and a distribution plate is positioned in the hydraulic circuit between the pump and the motor. The distribution plate is coupled to the motor cylinder and slidably, rotatably contacts an end surface of the pump cylinder. A pump swash plate is fixed to the motor cylinder and moves each of the pump plungers in response to the relative rotation of the motor cylinder and the pump cylinder. A casing houses the hydraulic pump and the hydraulic motor and a motor swash plate is mounted on the casing for moving each of the motor plungers in response to the rotation of the motor cylinder.

7 Claims, 2 Drawing Sheets

NON-STEP HYDRAULIC TRANSMISSION

This application is a continuation of application Ser. No. 314,551, filed Oct. 23, 1981, now abandoned.

BACKGROUND OF THE INVENTION

1. Field of the Invention

This invention relates to an improvement in a non-step hydraulic transmission consisting of a multi-plunger type hydraulic pump and a multi-plunger type hydraulic motor which concentrically surrounds the hydraulic pump and is hydraulically connected to the pump. The reciprocating strokes of plungers of the hydraulic motor are regulated in a non-stepped manner by varying an angle of inclination of a motor swash plate, which is adapted to reciprocatingly move the plungers of the hydraulic motor.

2. Description of the Prior Art

In a transmission of this kind in general, the supplying of a working oil from a hydraulic pump and the receiving thereof by a hydraulic motor are controlled by a distribution plate joined to an end of a motor cylinder and placed in sliding contact with an end surface of a pump cylinder. Since the distribution plate and pump cylinder are slidingly rotated in relation to each other, the working oil is liable to leak through a gap between the slide surfaces thereof. In order to prevent such leakage of working oil in a conventional transmission, a spring is provided between a pump cylinder and an input shaft for actuating the pump cylinder, so as to bias the pump cylinder into pressing contact with a distribution plate owing to the resilient force of the spring. However, when the hydraulic pump is in operation, a twisting moment works from a pump swash plate on the pump cylinder via pump plungers, and the resilient force of the spring is unable to resist the twisting moment and contact pressure between the pump cylinder and distribution plate is reduced. This results in the leakage of oil, which causes a decrease in a volume efficiency, and the pulsating of hydraulic pressure due to the floating vibrations of the pump cylinder.

SUMMARY OF THE INVENTION

An object of the present invention is to provide a non-step hydraulic transmission which is free from the above-mentioned inconveniences encountered in a conventional transmission of this kind, and which maintains a constant excellent contacting condition of a pump cylinder and a distribution plate by supporting the pump cylinder on a motor cylinder firmly against the twisting moment produced by the pump swash plate.

DETAILED DESCRIPTION OF THE PREFERRED EMBODIMENTS

Figure 1:
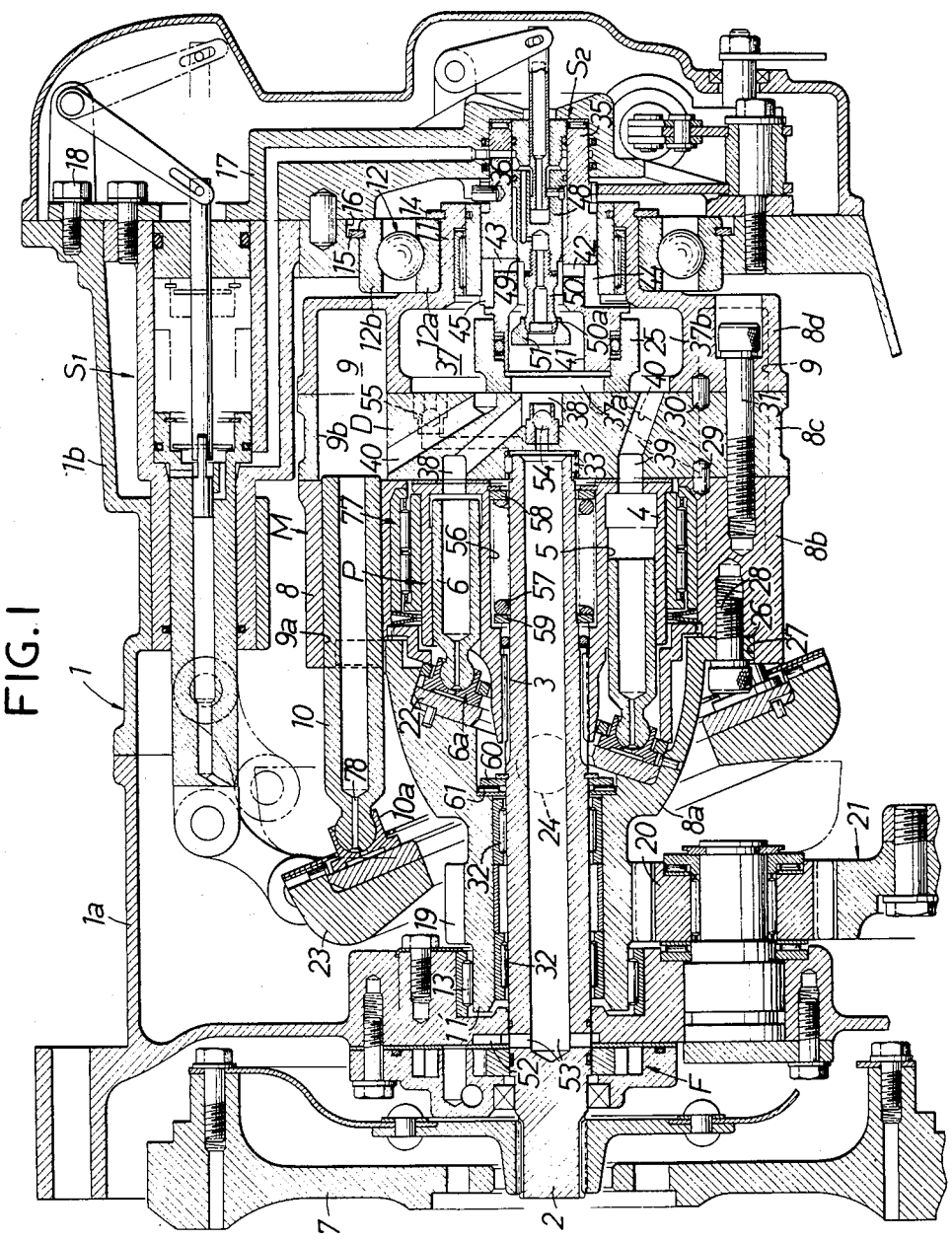
FIG. 1 is a side elevational view in longitudinal section of an embodiment of a non-step hydraulic transmission according to the present invention.
Figure 2:
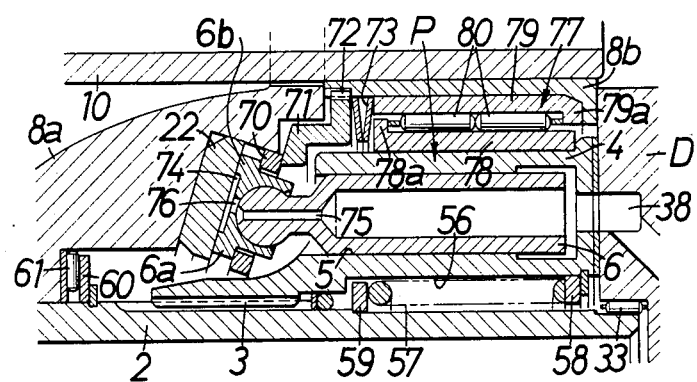
FIG. 2 is an enlarged side elevational view in longitudinal section of a principal portion of the preferred embodiment of the present invention.

An embodiment of the present invention will be described with reference to the accompanying drawings.

A transmission case 1 consists of two longitudinally divided case members 1a, 1b joined together. A transmission set in the transmission case consists of a hydraulic pump P and a hydraulic motor M.

The hydraulic pump P has a pump cylinder 4 spline-connected at 3 at the central portion thereof to an input shaft 2. A plurality of pump plungers 6, 6 ... are slidably fitted in a plurality of cylinder bores 5, 5 ..., which are arranged annularly in the pump cylinder 4 so as to surround the center of rotation thereof. The power from an engine (not shown) is transmitted to the input shaft 2 via a flywheel 7. The hydraulic motor M has a motor cylinder 8 disposed in such a manner that the motor cylinder 8 surrounds the pump cylinder 4 concentrically therewith so as to be rotated in relation thereto. A plurality of motor plungers 10, 10 ... are slidably fitted in a plurality of cylinder bores 9, 9, which are arranged annularly in the motor cylinder 8 so as to surround the center of rotation thereof.

A pair of support shafts 11, 11' project from both of the axial end surfaces of the motor cylinder 8. The support shaft 11 is supported on an end wall of the right case member 1b via ball bearing 12, and the other support shaft 11' is supported on an end wall of the left case member 1a via needle bearing 13. A stopper ring 14 for holding an inner race 12a for the ball bearing 12 between the stopper ring 14 itself and the motor cylinder 8 is engaged with an outer end of the support shaft 11. Another stopper ring 15, which is engaged with an outer end portion of the outer circumferential surface of an outer race 12b for the ball bearing 12, is also engaged with an annular recess 16 formed in the outer surface of an end wall of the right case member 1b. A press plate 17 contacting the outer end of the outer race 12b is fixed detachably to the right case member 1b with bolts 18. Thus, the axial movements of the ball bearing 12 and support shaft 11 with respect to the right case member 1b, can be prevented.

The support shaft 11', with which a gear 19 is integrally formed, serves as an output shaft. The output from the hydraulic motor M is taken from the gear 19 and transmitted to a differential gear 21 via an intermediate gear 20.

A pump swash plate 22 inclined at a predetermined angle with respect to the pump plungers 6 is fixed to the inner side of the motor cylinder 8. A shoe 6a adapted to slidingly contact the spherical outer end portion of each of the pump plungers 6. Thus, the pump swash plate 22 can be operated to cause the pump plungers 6 to be moved reciprocatingly in accordance with the rotation of the pump cylinder 4, and thereby make repeated suction and exhaust strokes.

All of the shoes 6a, 6a ... have flanges 6b, 6b ... at their respective outer circumferential portions, and a common seat plate 70 is superposed on the rear surfaces of the flanges 6b, 6b ... A presser 71, which is opposed to the rear surface of the seat plate 70, is spline-connected at 72 to the inner peripheral surface of the motor cylinder 8 in such a manner that the presser 71 can be axially slid on the latter. Accordingly, the presser 71 can be rotated with the motor cylinder 8 and slides freely in the axial direction. A spring 73 urges the presser 71 against the seat plate 70 and is positioned between the presser 71 and motor cylinder 8. In the embodiment shown in the drawings, a cross-sectionally V-shaped spring consisting of two plate springs is used as the spring 73. A coiled spring or a corrugated plate spring can be substituted for the two plate spring 73. Thus, all of the shoes 6a, 6a ... receive a suitable resilient force from the spring 73 which urges the shoes against the inclined surface of the pump swash plate 22, so that the shoes 6a, 6a ... can be slid on the pump swash plate 22 without floating therefrom, in accordance with the relative rotations of the pump cylinder 4 and motor cylinder 8. Even when the shoes 6a are worn during the sliding movements thereof, the wear can be compensated for immediately by a forward displacement of the presser 71 due to the resilient force of the spring 73, so that the press-contacting condition of the shoes 6a with respect to the pump swash plate 22 is not changed.

Each shoe 6a has a hydraulic pocket 74 in the front surface thereof. In order to communicate the hydraulic pocket 74 with an oil chamber in the pump cylinder 4, oil ports 75, 76, which communicate with each other, are provided in the pump plunger 6 and shoe 6a, respectively. Therefore, while the pump cylinder 4 is in operation, a pressurized oil therein is supplied to the hydraulic pockets 74, and a pressure is applied by the pressurized oil to the shoes 6a so as to support a thrust force applied from the pump plunger 6 to the shoes 6a. This allows the contact pressure between the shoes 6a and pump swash plate 22 to be reduced, and, simultaneously, the slide surfaces of the shoes 6a and pump swash plate 22 to be lubricated.

A motor swash plate 23 is pivotally supported on the transmission case 1 in such a manner that the motor swash plate 23 is opposed to the motor plungers 10 and can be oscillatingly moved via a pair of trunnions 24 which project from the inner and outer sides of the swash plate 23. A shoe 10a slidably contacts the inclined surface of the motor swash plate 23 and is positioned at a spherical end portion of each of the motor plungers 10. Thus, the motor swash plate 23 permits the reciprocating movement of the motor plungers 10 in accordance with the rotation of the motor cylinder 8 to make repeated expansion and compression strokes.

During the reciprocating movements of the motor plungers 10, the stroke of each can be regulated in a non-stepped manner between zero and a maximum level by oscillating the motor swash plate 23 between a position in which the motor swash plate 23 is perpendicular with respect to the motor plungers 10 and a position shown as a solid line in the drawing, in which the motor swash plate 23 is inclined at a maximum level. The shoe 10a of each of the motor plungers 10 is provided with a hydraulic support means similar to that applied to the shoe 6a of each of the pump plungers 6.

A hydraulic closed circuit is formed between the hydraulic pump P and hydraulic motor M via a distribution plate D and a distribution ring 25, which will be described later. When the pump cylinder 4 is rotated via the input shaft 2, a high-pressure working oil discharged from a cylinder bore 5 holding a pump plunge 6 in a exhaust stroke flows to a cylinder bore 9 holding a motor plunger 10 in an expansion stroke, while a working oil discharged from a cylinder bore 9 holding a motor plunger 10 in a compression stroke is returned to a cylinder bore 5 holding a pump plunger 6 in a suction stroke. During the above operation, the motor cylinder 8 is rotated by the sum of a reaction torque applied from the pump plunger 6 in an exhaust stroke to the motor cylinder 8 via the pump swash plate 22 and a reaction torque received by the motor plunger 10 in an expansion stroke from the swash plate 23.

A change gear ratio of the motor cylinder 8 with respect to the pump cylinder 4 is determined by the following equation.

$$\text{Change gear ratio} = \frac{\text{Number of revolutions per minute of pump cylinder 4}}{\text{Number of revolutions per minute of motor cylinder 8}}$$

$$= 1 + \frac{\text{Capacity of hydraulic motor } M}{\text{Capacity of hydraulic pump } P}$$

As is clear from the above equation, a change gear ratio can be changed from one to a desired level by changing the capacity of the hydraulic motor M from zero to a desired level. The capacity of the hydraulic motor M is determined by the stroke of the motor plungers 10. Accordingly, when the motor swash plate 23 is moved as mentioned above from a position in which it stands perpendicular to a position in which it is inclined at a certain angle, the change gear ratio can be changed from one to a certain number in a non-stepped manner. A hydraulic servomotor S1 is provided in the transmission case 1 for moving the motor swash plate 23.

The motor cylinder 8 consists of axially-divided first to fourth sections 8a-8d. The first section is formed like a cup, which is provided with the support shaft 11' and pump swash plate 23. The second section 8b is formed cylindrically so as to surround are part of the cylinder bores 9 and adapted to guide the sliding motor plungers 10 therethrough. The third and fourth sections 8c 8d are provided with continuously-extending oil chamber-forming bores 9b, which also form parts of the cylinder bores 9, and which have a diameter slightly greater than that of the bearing bores 9a. The third section 8c is provided with the distribution plate D formed integrally therewith.

The first section 8a has a connecting flange 26, which is formed integrally therewith, at the end portion thereof which is opposed to the second section 8b. The flange 26 is fitted closely in a positioning recess 27 provided in the end surface of the second section 8b which is opposed thereto, and fastened to the second section 8b with a plurality of bolts 28. The second, third and fourth sections 8b, 8c, 8d are positioned with respect to one another by knock pins 29, 30 inserted into joint portions thereof, and then combined together with a plurality of bolts 31.

The input shaft 2 is supported at its outer end portion on the central portion of the support shaft 11' via needle bearings 32, and at its inner end portion on the central portion of the distribution plate D via needle bearings 33. An annular spring chamber 56 is formed between opposed circumferential surfaces of the input shaft 2 and pump cylinder 4, which spring chamber 56 is adjacent to the spline-connected portion 3. A compression spring 57 is housed in the spring chamber 56, and is in resilient contact at its right end with a seat 58 engaged with the pump cylinder 4, and at its left end with a seat 59 engaged with the input shaft 2. A stopper plate 60 is engaged with that portion of the input shaft 2 which is projected from the left end surface of the pump cylinder 4, the stopper plate 60 being opposed to the inner end surface of the motor cylinder 8. Needle thrust bearings 61 are provided between the opposed surfaces of the stopper plate 60 and motor cylinder 8. Thus, the resilient force of the spring 57 serves to urge the pump cylinder 4 against the distribution plate D via the seat 58, so that the opposed surfaces of the pump cylinder 4, seat 58 and distribution plate D can be brought into close contact with one another. The reaction force of the resilient force of the spring 57 is transmitted to and supported by the motor cylinder 8 via the seat 59, input shaft 2, stopper plate 60 and needle thrust bearings 61.

The pump cylinder 4 is supported at the outer circumferential surface thereof on the inner circumferential surface of the annular portion, i.e., the second section 8b, of the motor cylinder 8 via a needle bearing 77 to allow the pump cylinder 4 to be held concentric with the motor cylinder 8. It is effective to provide a suitable clearance in the spline-connected portion 3 of the input shaft 2 and pump cylinder 4 for the purpose of preventing the input shaft 2 from interfering with the concentric relation between the cylinders 4, 8. The bearing 77 consists of an inner race 78 fitted on the outer circumferential surface of the pump cylinder 4, an outer race 79 fitted on the inner surface of the motor cylinder 8, and a plurality of rows of needle rollers 80. In order to restrict the axial movements of the needle rollers 80 and flanges 78a, 79a holding the needle rollers 80 therebetween in the direction of the axes thereof are formed integrally with the races 78, 79, respectively, in such a manner that the flanges 78a, 79a are positioned at axially opposite end portions of the races 78, 79.

The force applied from the pump swash plate 22 to a pump plunger 6 during the operation of the hydraulic pump P can be divided into a component of force in the direction of the axis of the pump plunger 6 and a component of force in the direction at right angles to the direction of the first-mentioned component of force. The perpendicular component of force works as a twisting moment on the pump cylinder 4 but this twisting moment is transmitted to and supported by the motor cylinder 8 via the bearing 77. Accordingly, the pump cylinder 4 is not inclined, so that a suitable contacting condition of the pump cylinder 4 and distribution plate D can be maintained.

A fixed shaft 35, which is passed through the support shaft 11 for the motor cylinder 8, is connected to the press plate 17 via pins 36. The distribution ring 25 contacting the distribution plate D is supported eccentrically on the inner end of the fixed shaft 35, and a hollow portion 37 of the fourth section 8d of the motor cylinder 8 is divided into an inner chamber 37a and an outer chamber 37b by the distribution ring 25. The distribution plate D is provided with exhaust and suction ports 38, 39. A cylinder bore 5 for a pump plunger 6 in an exhaust stroke is communicated with the inner chamber 37a via the exhaust port 38, while a cylinder bore 5 for a pump plunger 6 in a suction stroke is communicated with the outer chamber 37b via the suction port 39. The distribution plate D is also provided with a plurality of communication ports 40, 40 . . . , via which the cylinder bores 9, 9 . . . in the motor cylinder 8 communicate with the inner chamber 37a or the outer chamber 37b.

Therefore, when the pump cylinder 4 is rotated, a high-pressure oil flow generated in an exhaust stroke of a pump plunger 6 flows from the exhaust port 38 into the inner chamber 37a. The high-pressure oil further flows via a communication port 40, which communicates with the inner chamber 37a, into a cylinder bore 9 of a motor plunger 10 in expansion stroke to apply a force to the plunger 10. On the other hand, hydraulic fluid discharged by a motor plunger 10 in a compression stroke is returned to a cylinder bore 5 of a pump plunger 6 in a suction stroke via a communication port, which communicates with the outer chamber 37b, and the suction port 39. Because of the circulation of the hydraulic fluid, hydraulic pressure is transmitted as mentioned previously from the hydraulic pump to the hydraulic motor M.

The fixed shaft 35 has a central bore 41, and a plurality (two in the embodiment shown in the drawings) of short-circuit ports 42, 43 extending through a side wall thereof. The short-circuit ports 42, 43 communicate at their respective inner ends with the inner chamber 37a via the central bore 41, and at their respective outer ends, with the outer chamber 37b via outer grooves 44, 45. The short-circuit ports 42, 43 are adapted to be opened and closed in accordance with the rightward and leftward movements of a clutch valve 48 slidably fitted in the central bore 41. Namely, when the clutch valve 48 is moved to the right, the short-circuit ports 42, 43 are opened to allow the inner and outer chambers 37a, 37b to communicate with each other. Consequently, the hydraulic fluid discharged from the exhaust port 38 of the distribution plate D immediately flows into the suction port 39, so that the hydraulic fluid is not supplied to the hydraulic motor M. As a result, the transmission is in a so-called clutch-off state, in which the hydraulic motor M is not in operation. When the clutch valve 48 is then moved to the left to close both of the short-circuit ports 42, 43, an operation for circulating the hydraulic fluid from the hydraulic pump P to the motor M is resumed, so that the transmission is in a clutch-on state. Between an instant at which the transmission is in a clutch-off state and an instant at which the transmission is in a clutch-on state, i.e., when the clutch valve 48 is in an intermediate position, the circulation of hydraulic fluid occurs to such an extent that it is in accordance with the degree of opening of the short-circuit ports 42, 43, so that the transmission is in a semi-clutch-on state.

A valve rod 50 is screwed to the front end of the clutch valve 48, and an umbrella type valve body 51 is connected to a spherical end portion 50a of the valve rod 50. This valve body 51 can be brought into close contact with the distribution plate D so as to close the exhaust port 38 when the clutch valve 48 is moved to the right beyond a clutch-on position. The exhaust port 38 is thus closed with the valve body 51 when the motor swash plate 23 has been put in a perpendicular position to set the change gear ratio to 1:1. Thus, the pump plunger is hydraulically locked to allow the motor cylinder 8 to be mechanically actuated by the pump cylinder 4 via the pump plungers 6 and pump swash plate 22. Accordingly, the force to be applied from the motor plunger 10 to the motor swash plate 23 is lost, so that the resistance of each part against the force can be reduced.

In order to slidingly move the clutch valve 48, a hydraulic servomotor S2 is provided on the fixed shaft 35.

A supplementary pump F is provided on the outer side of U the left case member 1a. This pump F is operated by the input shaft 2 to suck an oil from an oil reservoir (not shown) to generate a working fluid of a predetermined pressure. The pump F communicates at a discharge port 52 thereof with the exhaust port 38 of the distribution plate D and outer chamber 37b via an oil passage 53 in the input shaft 2 and check valves 54, 55. Therefore, when the working fluid leaks from the hydraulic closed circuit of the hydraulic pump P and hydraulic motor M, hydraulic fluid can be fed automatically from the supplementary pump P so as to compensate the loss of fluid.

According to the present invention, the pump cylinder 4 is supported via the bearing 77 on the inner circumferential surface of the annular portion 8b of the motor cylinder 8. The motor cylinder 8 is positioned to surround the pump cylinder 4, so that the pump cylinder 4 and distribution plate D can be kept reliably in a suitable contacting condition without obstructing the relative rotations of the pump cylinder 4 and distribution plate D. Moreover, the pump cylinder 4 neither floats from the distribution plate D nor is vibrated in spite of a twisting moment which the pump cylinder 4 receives from the pump swash plate 22 via the pump plungers 6. Accordingly, the leakage of hydraulic fluid, the pulsating of hydraulic pressure and a decrease in the volume efficiency can be prevented.

While the invention has been particularly shown and described with reference to a preferred embodiment thereof, it will be understood by those skilled in the art that modifications and variations can be made in the light of the above teachings without departing from the spirit and scope of the invention.

What is claimed is:

1. A non-step hydraulic transmission comprising:
   (a) a hydraulic pump having a pump cylinder, and a plurality of plunger means slidably fitted in said pump cylinder, said pump plunger means being arranged in a circular pattern around the axis of said pump cylinder;
   (b) a hydraulic motor having a motor cylinder concentrically surrounding said pump cylinder and a plurality of motor plunger means slidably fitted in said motor cylinder, said motor plunger means being arranged in a circular pattern around the axis of said motor cylinder;
   (c) a hydraulic circuit means for hydraulically coupling said pump and said motor;
   (d) distribution plate means positioned in said hydraulic circuit means between said pump and said motor, said distribution plate means being coupled to said motor cylinder and slidably, rotatably contacting an end surface of said pump cylinder;
   (e) bearing means positioned between the outer circumferential surface of said pump cylinder and the inner circumferential surface of said motor cylinder, for supporting said pump cylinder on the inner circumferential surface of said motor cylinder and for transmitting to said motor cylinder a component of force which is applied from said pump swash plate to said pump plunger means in a direction normal to the axis of said pump plunger means, thereby preventing inclination of said pump cylinder relative to said motor cylinder;
   (f) pump swash plate means, fixed to said motor cylinder, said pump swash plate means moving each of said pump plunger means in response to the relative rotation of said motor cylinder and said pump cylinder; and
   (g) casing means for housing said hydraulic pump and said hydraulic motor.

2. A hydraulic transmission as set forth in claim 1, including a motor swash plate mounted on said casing means for moving each of said motor plunger means in response to the rotation of said motor cylinder.

3. A hydraulic transmission as set forth in claim 2, wherein said motor swash plate is pivotally mounted on said casing means such that the angle of inclination thereof is variable.

4. A hydraulic transmission as set forth in any one of claims 1–3 including spring means for biasing said pump cylinder into contact with said distributor plate means.

5. A hydraulic transmission as set forth in claim 4, wherein said pump cylinder includes a spring chamber for housing said spring means.

6. A hydraulic transmission as set forth in claim 1, wherein said bearing means comprises an inner race fitted on the outer circumferential surface of said pump cylinder, an outer race fitted on the inner circumferential surface of said motor cylinder, and a roller means disposed between said inner and outer races.

7. A hydraulic transmission as set forth in claim 6, wherein said bearing means is a needle bearing.

* * * * *